United States Patent [19]

Sherman et al.

[11] Patent Number: 4,916,654

[45] Date of Patent: Apr. 10, 1990

[54] METHOD FOR TRANSFER OF DATA VIA A WINDOW BUFFER FROM A BIT-PLANAR MEMORY TO A SELECTED POSITION IN A TARGET MEMORY

[75] Inventors: Arthur M. Sherman, Morgan Hill; Peter C. Yanker, Portola Valley, both of Calif.

[73] Assignee: International Business Machines Corporation, Armonk, N.Y.

[21] Appl. No.: 242,327

[22] Filed: Sep. 6, 1988

[51] Int. Cl.[4] ............................................... G06F 12/00

[52] U.S. Cl. .................................... 364/900; 364/965; 364/965.3; 364/947; 364/947.6

[58] Field of Search ......................... 364/200, 300, 900

[56] References Cited

U.S. PATENT DOCUMENTS

| | | | |
|---|---|---|---|
| 3,917,933 | 11/1975 | Scheuneman et al. | 364/200 X |
| 3,938,102 | 2/1976 | Morrin et al. | 340/900 X |
| 3,973,245 | 8/1976 | Belser | 340/200 |
| 4,434,502 | 2/1984 | Arakawa et al. | 382/41 |

*Primary Examiner*—Raulfe B. Zache
*Attorney, Agent, or Firm*—Perman & Green

[57] ABSTRACT

A graphic display PC/interface system is described which includes three memory units: a source memory which is addressed in planar byte increments and stores display data units on a bit per plane basis; a target memory for storing display data units in a manner suitable for operation of a display unit; and a window buffer for transferring display data unit from the source memory to the target memory. The system transfers a quantity of display data unit bytes from the source memory to the target memory by accessing pairs of planar bytes, which pair of planar bytes may have a display data unit byte bridging therebetween. The method comprises selecting a first pair of planar bytes from the source memory; aligning the display data unit byte which lies totally within the selected first pair of planar bytes; selecting a second pair of planar bytes from the source memory; aligning a display data unit byte which lies totally within the second selected pair of planar bytes; consolidating the display data unit byte which bridges between the first and second pairs of selected planar bytes; aligning the consolidated display data unit byte; and transferring aligned display data unit bytes to the window buffer.

11 Claims, 3 Drawing Sheets

METHOD FOR TRANSFER OF DATA VIA A WINDOW BUFFER FROM A BIT-PLANAR MEMORY TO A SELECTED POSITION IN A TARGET MEMORY

FIELD OF INVENTION

This invention relates to a method and apparatus for transferring data from one memory to another memory and, more particularly, to a method and apparatus for transferring a block of data from a bit-planar organized source memory to a selected position in a target memory.

REFERENCE TO RELATED APPLICATION

This invention is related to an invention described in co-pending U.S. patent application Ser. No. 07/242,326, filed Sept. 6, 1988, entitled High Speed Method For Data Transfer by Yanker and Sherman and assigned to the same assignee as this application.

BACKGROUND OF THE INVENTION

Methods for moving blocks of data around data processing systems have been in existence for a number of decades. In large scale data processing systems, such data transfers are accomplished on a regular basis through bus or other interconnection arrangements. Such systems easily accommodate large blocks of data and are able to handle them rapidly on a pipeline basis, without significantly slowing overall operations. It is desirable to accomplish the same type of transfer in a personal computer (PC) or a system of PC's, but often their designs do not render themselves amenable to such operations. Of necessity, PC's are more limited in capability and function. This does not, however, inhibit the user from demanding ever increasing levels of performance from their units. This is especially true with respect to PC's used to drive sophisticated graphics display units.

PC memories are often not designed to interface easily with sophisticated graphic display units. For instance, many PC random access memories (RAM) are organized on a bit-planar basis with the respective bits of a byte or word resident in a plurality of planes in corresponding bit positions. While such PC/RAM organizations are useful for data processing applications where predetermined blocks of data are accessed and handled, when it is necessary to access a block of data, where the block may have any starting point and any end point, and to transfer such block of data into a memory at a starting point chosen by the user, such an operation can be accomplished, but only relatively slowly.

Block data transfers are encountered in display applications where it is desirable to insert, in a display memory, a block of new data (e.g., insertion of a window of new data in a preexisting display). In those cases, the system must access a data unit corresponding to a first picture element (PEL) and then continue accessing data units until the last PEL is retrieved. The accessed data units must be aligned so that they are properly justified when inserted in the display memory. This allows optimum use of the display memory data capacity. Additionally, many PC RAMS are accessible on only a byte or larger data unit basis, so if the initial PEL starts in the interior of a byte, the PEL must be extracted from the byte, aligned and then transferred. All of this is preferably done with a minimum number of memory accesses to avoid the delay inherent therein.

Others have coped with such display-related data transfers in various ways. In U.S. Pat. No. 3,938,102 to Morrin et al, a system is described which accomplishes a 1-to-1 mapping between pq subarrays of points from an array of rspq points in an all-points addressable memory to a word organized RAM of pq modules. Only 1 point in each of the pq modules is accessible during a single memory cycle.

Belser, in U.S. Pat. No. 3,973,245, discloses a method for converting a vector-coded sub-array into a linear array which is suitable for raster display. Each line segment is represented by a sequence of X, Y coordinate values. A formatter, in response to the vector information, formats the vector data into an area word (an array of data points). This information is used to drive a raster display system.

In U.S. Pat. No. 4,434,502 to Arakawa, a system is shown for accessing display data distributed among four independent memories or blocks. This is accomplished by modifying an input address to arithmetically produce a plurality of addresses which are used to address a plurality of separate memory blocks. The memory block outputs pass through a selection/alignment matrix circuit which selects from the outputs of the memory blocks only those bytes in a desired block of data and aligns them into an array.

Accordingly, it is an object of this invention to provide a method and means for block data transfers when the blocks of data have variable starting and ending points.

It is another object of this invention to provide a rapid method and means for block data transfers of non-aligned data between memories.

A further object of this invention is to provide a rapid method and means for non-aligned data transfers wherein such transfers must pass through a restricting buffer system.

SUMMARY OF THE INVENTION

A system is described which includes three memory units: a source memory which is addressed in planar data unit increments and stores display data units on a bit per plane basis; a target memory for storing display data units in a manner suitable for operation of a display unit; and a window buffer for transferring display data units from the source memory to the target memory. The system transfers display data units from the source memory to the target memory by accessing pairs of planar data units, which pairs of planar data units may have a display data unit bridging between them. The method comprises selecting a first pair of planar data unit increments from the source memory; aligning the display data unit which lies within the selected first pair of planar data units; selecting a second pair of planar data units from the source memory; aligning the display data unit byte which lies within the second selected pair of planar data units; consolidating the display data unit which bridges between the first and second pairs of selected planar data units; aligning the consolidated display data unit; and transferring aligned display data units to the window buffer means.

DETAILED DESCRIPTION OF THE INVENTION

Figure 1:
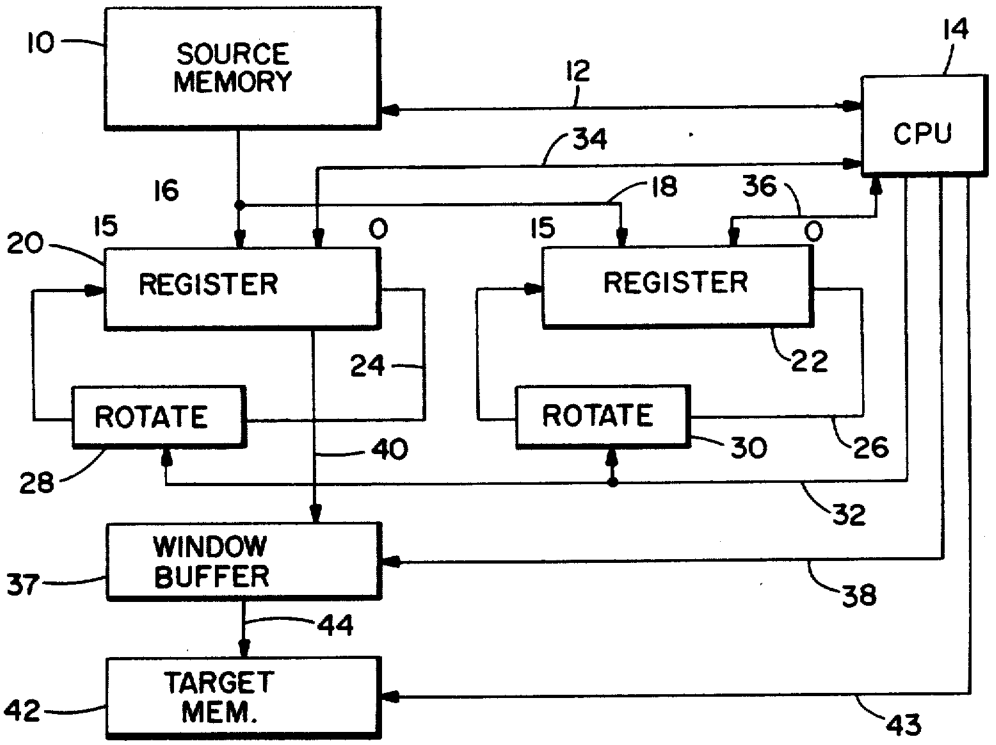
FIG. 1 is a block diagram of a system incorporating the invention.

Referring now to FIG. 1, there is shown a block diagram of a portion of the circuitry contained in a PC, such as the IBM PS/2. The objective of the invention is to move image data from one memory to another at very high data rates notwithstanding the fact that the image data in the initiating memory is stored in one block format and must be stored in a display memory in a different block format. Furthermore, the invention is adapted to: access image data at any starting point; handle any length of image data; and emplace such data, properly organized and aligned, at any position in the display memory.

Source memory 10 is a RAM that is bit-planar organized and has its input-output functions controlled via line 12 from cpu 14. Memory bytes from source memory 10 are read out via lines 16 and 18 to register 20 and register 22. Registers 20 and 22 are adpated to serially shift data, in a reentrant manner, via lines 24 and 26 through rotate controls 28 and 30 respectively. Registers 20 and 22 are each 2 bytes in length. Bits moved out of the end of each of registers 20 and 22 are reinserted at the other end of each of the registers via rotate controls 28 and 30. Rotate controls 28 and 30 are controlled via line 32 from cpu 14. Additionally, each of registers 20 and 22 is adapted to transfer its contents to the other under the control of cpu 14 via lines 34 and 36. A window buffer 37 is controlled by line 38 from cpu 14 and comprises an 8 bit wide, 4 byte buffer. It receives its input data via line 40 from register 20 and in turn provides its data to a target memory 42 via line 44. CPU 14 controls the operation of target memory 42 via line 43.

The structures of source memory 10, window buffer 37 and target memory 42 will be described with reference to FIGS. 2, 3 and 4, respectively.

Figure 2:
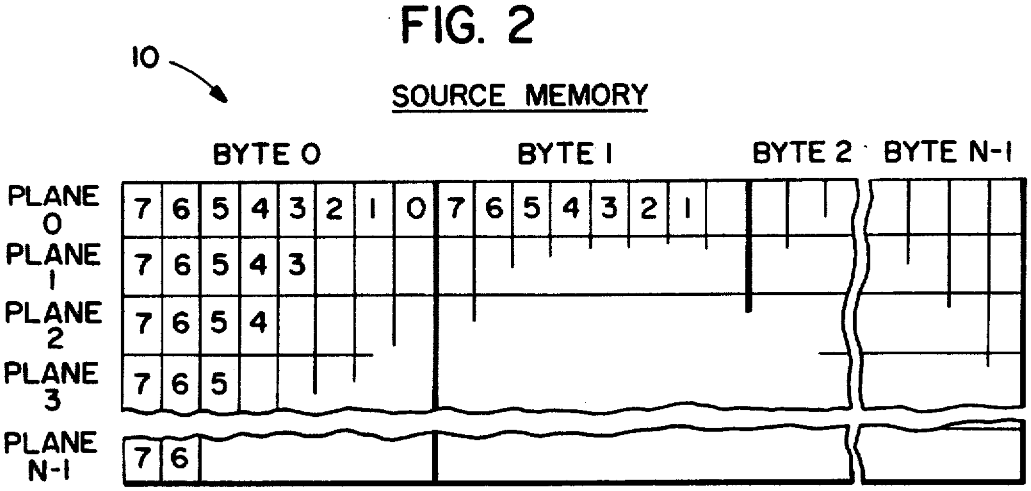
FIG. 2 outlines the structure of the source memory employed by the system of FIG. 1.

As shown in FIG. 2, source memory 10 comprises a plurality of planes. Each plane is organized on a byte basis and includes N−1 bytes with the first byte being designated "byte 0". Each byte is 8 bits long and is shown organized with the high order bits being orientated on the left of the byte and the low order bytes on the right. In source memory 10, a data byte or word is organized on a bit per plane basis. For instance, the first bit of a word will occupy bit position 7 in byte 0 in plane 0. The second bit of the word will occupy position 7 of byte 0 in plane 2 etc. In many PC memories, source memory 10 is only capable of accessing planar data on a byte or word basis. (e.g., source memory 10 is only able to access an entire byte even though the desired initial data word resides in the middle of the byte).

Figure 3:
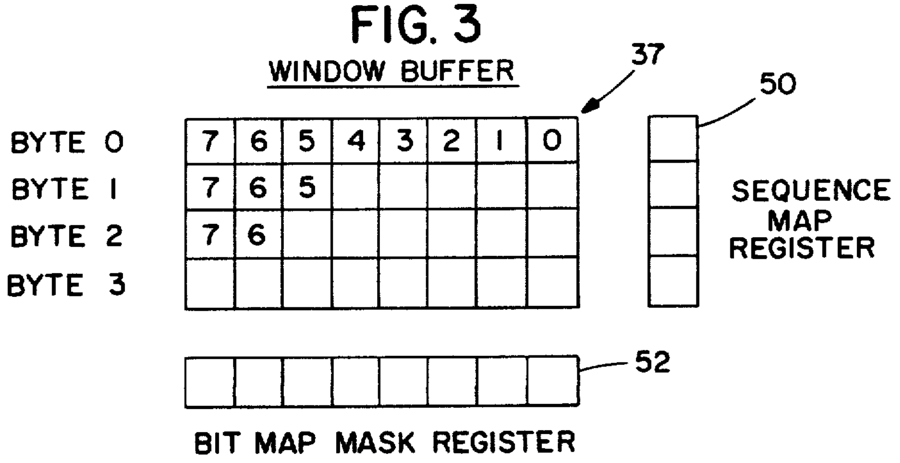
FIG. 3 outlines the structure of the window buffer employed in the system of FIG. 1.

In FIG. 3, the structure of window buffer 37 is schematically illustrated and includes 4 bytes of data, oriented on a planar basis. However, in this instance, each of planes 0-3 is adapted to store full data bytes which are recognizable by the system as information-containing data (this is in contrast to the bytes in each plane of source memory 10 which have no informational substance that can be recognized by the CPU). Window buffer 37 is further provided with a sequence may register 50 and a byte mask register 52. These registers are employed to control which of the planes of window buffer 37 are accessed; and which of the bits contained within each plane of window buffer 37 are accessed.

Figure 4:
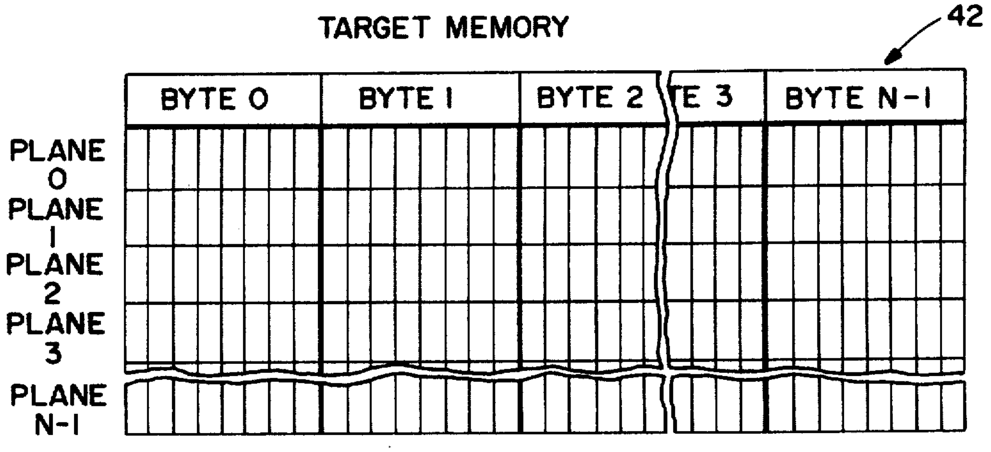
FIG. 4 outlines the structure of the target memory employed in the system of FIG. 1.

Target memory 42, schematically illustrated in FIG. 4, is organized much the same as source memory 10, in that it is bit-planar. However, its memory positions have no particular preexisting alignment with those of source memory 10. The data units (bytes) from target memory 42 are employed to drive a display device (not shown) and are replaced if the data being displayed is to be changed. Such requirement to change data may occur anywhere in target memory 42 and the initial PEL for such changed data may occur in any planar byte.

In the normal operation of a PC-driven, graphics system, the user selects an area of data to be displayed and instructs the system to perform the selection and display function. Through inputs from an appropriate device (e.g., light pen, mouse etc.), the system is provided with data which enables cpu 14 to commence certain initialization steps. That data includes a starting PEL number, its address within source memory 10; the starting address where the first PEL will be placed in target memory 42; and the total number of PELS to be transferred from source memory 10 to target memory 42.

Figure 5:
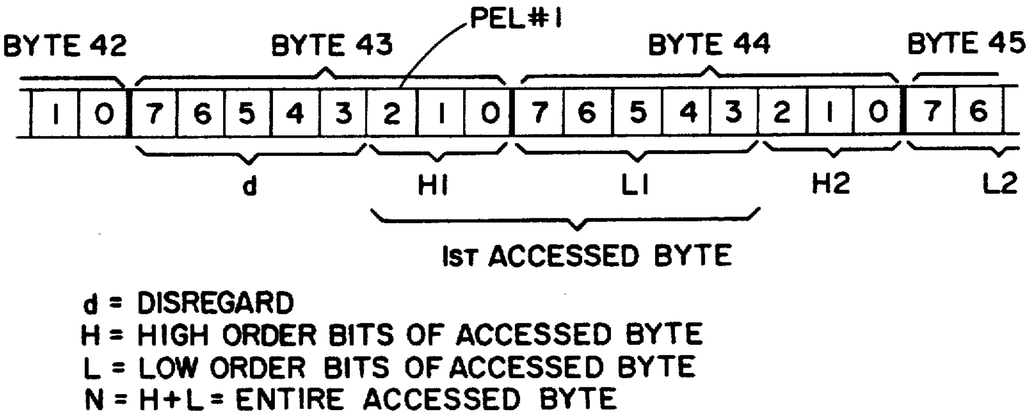
FIG. 5 illustrates an example of the planar byte structure of the source memory.

To obtain the starting PEL byte address in source memory 10, the initial PEL number is divided by 8 to obtain the byte address within which the PEL resides in source memory 10. For instance, assuming a 640×480 PEL display (where each raster line includes 640 PELS), if PEL 349 is the first PEL to be displayed, it's PEL number is divided by 8 to identify its corresponding planar byte in source memory 10. If the result has no remainder, it indicates that the PEL byte begins at the 0 bit position of the planar byte. If the remainder is other than zero, the PEL byte commences at 1+the remainder in the planar byte, since the 0 position is reserved for the 0 remainder. In the example given, the result is 43 with a remainder of 5. Thus, the first bit of PEL 349 resides in byte 43 at bit position #2. This is illustrated in FIG. 5 wherein plane 0 of source memory 10 is shown and in particular, bytes 43, 44, 45, etc.

To obtain the starting PEL byte address within target memory 42, the user selected initial PEL position in the display is divided by 8. For example, if it is assumed that the user wishes to have the first PEL appear at PEL position 82 on the display screen, the PEL position is equivalent to 82/8=10 with a 2 remainder. Thus, the first PEL must be inserted into byte 10 of the target memory and in particular, in bit position 5 thereof. The difference between the initial PEL position within in source memory 10 and the initial PEL position within target memory 42 provides the offset which indicates the amount the data must be moved to align each source memory display data byte with the selected target storage byte position. In the example given, the offset difference is 5−2=3.

Once the system has completed the initialization procedure, it knows (a) the starting bit position and byte address of the initial PEL in source memory 10; the starting bit position and byte address of the initial PEL in target memory 42; the offset in bits positions therebetween; and the number of PELS required to be transferred.

As aforestated, memory transfers from source memory 10 to target memory 42 take place through window buffer 37. The operation below described accomplishes the alignment of the display data bytes accessed from source memory 10 so that they may be inserted into the window buffer 37 and then transferred to target memory 42 in proper alignment.

Briefly referring back to FIG. 1, it will be recalled that each of registers 20 and 22 are 2 bytes long (16 bits each). It is registers 20 and 22 which, in combination with the other components of the system, provide the alignment function so that the bytes being accessed from source memory 10 appear in window buffer 37 in a justified manner. It should be understood that the data unit lengths specified herein (bytes, etc.) are exemplary and any appropriate data unit lengths may be employed.

Referring now to FIG. 5, and continuing the example above described, the first PEL bit in source memory 10 resides in position 2 of byte 43. As will be recalled, source memory 10 is accessed on a byte basis and data transfers within the system and to target memory 42 are also accomplished on a byte basis. Thus, it is the display data byte in source memory 10 which begins with byte position 2 in byte 43 and ends with bit position 3 in byte 44, which is to be initially placed in target memory 42 starting at byte 10, 5th bit.

In the algorithm to be hereinafter described, the following legend will be used in FIGS. 5 and 6 to refer to certain groups of bits within each pair of accessed bytes. The symbol d indicates bits to be disregarded or which have been taken into account in a previous cycle of operation. The symbol H designates the high order bits of an accessed display data byte and the symbol L indicates, for those bits encompassed thereby, the lower order bits of the accessed display data byte. The symbol N represents an assembled display data byte with the high and low order bits in proper sequence.

Figure 6:
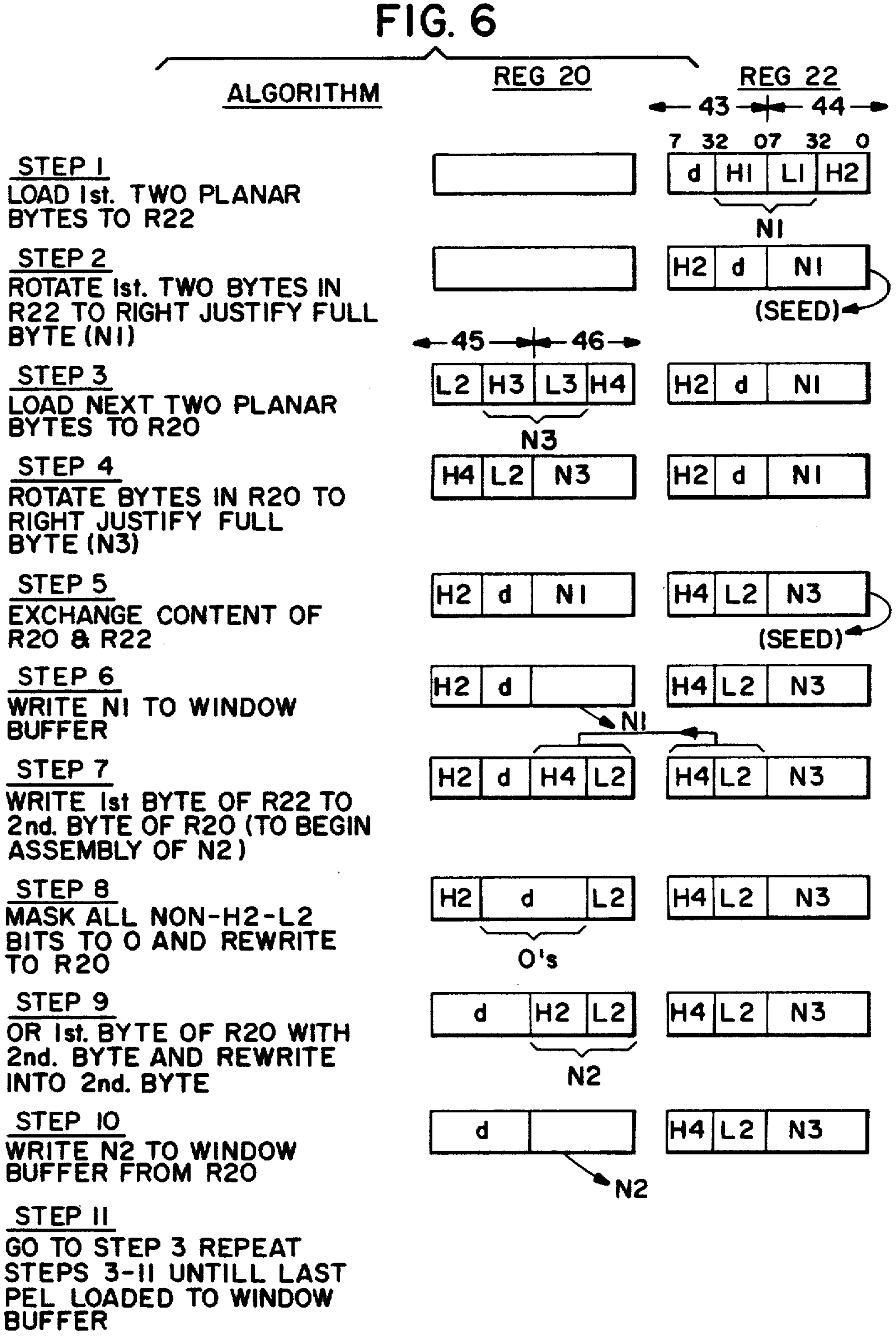
FIG. 6 illustrates the steps of an algorithm which accomplishes the invention in conjunction with the system shown in FIG. 1.

Referring now to FIG. 6, the algorithm which accomplishes the above described function is illustrated. Beneath each register indication is a schematic showing the contents of the registers at each stage of the algorithm's operation.

STEP 1

The first two bytes from source memory 10, which include the first byte of display data and its high order H1 bits and low order L1 bits, are loaded into register 22 (e.g. bytes 43 and 44 as shown in FIG. 5).

STEP 2

In register 22, bytes 43 and 44 are rotated to the right to right-justify the first display data byte N1. This causes the high order bits (H2) of the second display data byte to be rotated around to the left hand portion of register 22. The disregard (d) bits then reside between H2 and the first full display data byte N1. At this stage, the contents of register 22 may be termed "seed" data as they will later be employed to provide the initiating data for the alignment function and upon replacement by a new "seed" will enable the algorithm to repeat in an extremely fast manner.

STEP 3

The next two bytes, (e.g., bytes 45 and 46) are loaded into register 20. The data thus loaded includes N3 which is the 3rd display data byte to be hereinafter aligned.

STEP 4

The bytes in register 20 are rotated to right-justify display data byte N3.

STEP 5

The contents of registers 20 and 22 are exchanged. This is accomplished by registers 20 and 22 reading their contents into cpu 14 which, in turn, reads the contents back into registers 22 and 20 respectively (through lines 34 and 36). This establishes the "seed" condition for the next loop.

STEP 6

The first display data byte N1 is then read from register 20 into the byte 0 line of window buffer 37. It is advantageous to employ a single register for writing into window buffer 37 since, in many PC's, an instruction is provided which is optimized for reading data from a given register. For instance, in certain IBM PC's, the instruction STOSB has an op-code which occupies only a single byte and both stores data and increments the address at the same time.

STEP 7

The first byte (H4,L2) of register 22 is written into the second byte of register 20 (byte just vacated by N1). This is the first step to assembling the second display data byte.

STEP 8

A mask is now established within a register (not shown) in cpu 14 which eliminates all bits not associated with the second display data byte (N2). Then, the contents of register 20 are read via line 34 into cpu 14 which rewrites the data back into register 20 after it has been altered by the mask. The mask is generated by an examination of the number of bit positions of initial rotation needed to justify the first display data byte (N1). In this case, the shift was 3 bits to the right. Thus it is known that in register 20, the high order bits of the second (and succeeding) display data bytes will invariably occupy the left most 3 bits and the low order bits the right-most 5 bits. Thus, the mask is established to force zeros of the eight bits which reside therebetween.

STEP 9

The bits in the first byte of register 20 are then OR'd with the bits in the second byte of register 20 and the results rewritten into its second byte positions. This results in the second display data byte N2 being assembled, aligned and ready for transfer to window buffer 37.

STEP 10

N2 is transferred to byte 1 in window buffer 37.

STEP 11

The algorithm recycles to step 3 and repeats itself until the last PEL is loaded into window buffer 37 and transferred to target memory 42.

As the program recycles, it can be seen that the contents of register 22 (see Step 5) forms the seed for the next alignment procedure and that when the contents of the next two bytes are subsequently loaded into register 20 and the contents exchanged with register 22, that again the seed for the next step is established. This function repeats itself in a pipeline fashion; requires very few instructions for its implementation; handles two bytes per memory access; and is extremely rapid in implementation.

It is to be understood that the above described embodiments of the invention are illustrative only and that modifications throughout may occur to those skilled in the art. Accordingly, this invention is not to be regarded as limited to the embodiments disclosed herein, but is to be limited as defined by the appended claims.

We claim:

1. In a system comprising a source memory which includes a plurality of bit planes addressable in planar data units, display data units being stored therein on a bit-plane basis; a target memory for storing display data units; window buffer means interposed between said source memory and said target memory; and means for transforming preset data lengths of display data units from bit-planes in said source memory, via said window buffer, to said target memory, wherein a preset data length of said display data units may start at any planar data unit bit position and may bridge between adjacent planar data units, the method comprising:

selecting and aligning a first preset data length of display data unit bits which resides in a first pair of planar data units in said source memory;

selecting and aligning a second preset data length of display data unit bits which resides in a second pair of planar data units in said source memory;

consolidating a third preset data length of display data unit bits which bridges between said first and second pairs of planar data units;

aligning said consolidated third preset data length of display data unit bits; and transferring said aligned data lengths of display data unit bits to said window buffer means.

2. The system as defined in claim 1 wherein said first selecting and aligning step includes the step of rotating said first preset data length of display data unit bits to a preset boundary.

3. The system as defined in claim 2 wherein said second selecting and aligning step includes the step of rotating said second preset data length of display data unit bits to a preset boundary.

4. The system as defined in claim 3 wherein said transferring step first transfers said first preset data length of display data unit bits to said window buffer means.

5. The system as defined in claim 4 wherein said consolidating step further includes the step of moving a portion of said third preset data length of display data unit bits which is part of said second pair of planar data units into juxtaposition with a portion of said third display data unit bits which is part of said first pair of planar data units.

6. The system as defined in claim 5 wherein said consolidating step includes a masking step to assure proper ordering of the bits of said third preset data length of display data unit bits.

7. The system as defined in claim 6 wherein said transferring step, after the transfer of said first preset data length of display data unit bits, transfers said third consolidated display data unit bits to said window buffer means.

8. In a system for transferring bytes of display data bits from a bit-planar, byte organized source memory through a window buffer to a target memory, said system including first and second double byte register means, the method comprising:

loading into said first register means a first pair of bytes from a bit-plane of said source memory, said first pair of bytes including a byte of display data bits and a partial byte of display data bits;

aligning said byte of display data bits in said first register means;

loading into said second register means, a second pair of bytes from a bit-plane of said source memory, said second pair of bytes including a byte of display data bits and a partial byte of display data bits;

aligning said byte of said display data bits in said second register means;

consolidating said partial bytes of display data bits from said first and second register means into a consolidated byte and aligning said consolidated byte;

whereby said aligned bytes of display data bits may be transferred in alignment to said window buffer.

9. The system as defined in claim 8 further including the step of transferring one of said aligned bytes of display data unit bits from a register means to said window buffer, said consolidating step further including the step of transferring said partial bytes of display data unit bits into juxtaposition in one said register means.

10. The system as defined in claim 9 wherein said transfer step takes place through a mask which negates all bits not included in said partial bytes.

11. The system as in claim 10 further including the steps of Or'ing said partial bytes together to accomplish said consolidation and subsequently transferring said consolidated byte to said window buffer.

* * * * *